No. 760,541. Patented May 24, 1904.

UNITED STATES PATENT OFFICE.

CARL LUDWIG, OF SCHÖNBERG, GERMANY.

SUBSTITUTE FOR SHELLAC.

SPECIFICATION forming part of Letters Patent No. 760,541, dated May 24, 1904.

Application filed December 22, 1903. Serial No. 186,247. (No specimens.)

*To all whom it may concern:*

Be it known that I, CARL LUDWIG, a subject of the Emperor of Germany, residing at Schönberg, Grand Dukedom of Mecklenburg, Germany, have invented a new and useful Product as a Substitute for Shellac for the Purpose of Polishing and a Process of Obtaining the Same, of which the following is a specification.

The product essentially consists of cheap resins soluble in alcohol, being mixed with oleic acid and saponified by boiling with alkalihydroxid and decomposed by acid. The precipitate obtained after being washed and dried is the new product, which can substitute shellac for the purpose of polishing. Further, the work with the new product is cleaner than that with common shellac. The covering made by polishing is harder, so that it is more capable of resisting scratching. The work of polishing proceeds quicker, owing to the hardness of the covering, and the workman uses up less polishing material. The pores of smooth-planed wood do not become clogged by the new product as happens with shellac.

The price of the new product is considerably less than the price of shellac.

I obtain the new product by a process of which the following is an example: I boil nine parts of one hundred per cent. potassium hydroxid in one hundred and forty parts of water and I add little by little to the boiling mixture fifty-six parts of cheap resin, such as Manila copal, sandarac, or the like. When all is dissolved, I add of oleic acid $C_{18}H_{34}O_2$ two to three per cent. of the weight of the resin. After being cooled the solution is purified mechanically by filtering and is then somewhat diluted. Then it is decomposed by diluted sulfuric acid. The precipitate obtained after being washed and dried is the new product, substituting shellac for the purpose of polishing.

Having now described my invention and in what manner it is to be performed, what I claim is—

1. A product substituting shellac for the purpose of polishing consisting of cheap resins, soluble in alcohol, mixed with oleic acid, saponified by boiling with alkalihydroxid and decomposed by acid substantially as set forth.

2. Process for obtaining a substitute for shellac for the purpose of polishing consisting in boiling nine parts of one hundred per cent. potassium hydroxid with one hundred and forty parts of water, in adding thereto fifty-six parts of resin, soluble in alcohol, in adding of oleic acid, two to three per cent. of the weight of the resin, in purifying and decomposing the cooled and diluted mixture by diluted sulfuric acid and in washing and drying the obtained precipitate, substantially as set forth.

CARL LUDWIG.

Witnesses:
   JOHS. WULF,
   JULIUS WIESE.